United States Patent
Chiles

[11] 3,807,229
[45] Apr. 30, 1974

[54] BYPASS FLOWMETER

[75] Inventor: William Edward Chiles, Woodinville, Wash.

[73] Assignee: Electro Development Corporation, Lynnwood, Wash.

[22] Filed: Mar. 1, 1972

[21] Appl. No.: 230,573

[52] U.S. Cl. .............................. 73/203, 73/231 M
[51] Int. Cl. ............................................. G01f 1/10
[58] Field of Search...................... 73/194, 203, 231

[56] References Cited
UNITED STATES PATENTS

| | | | |
|---|---|---|---|
| 3,407,657 | 10/1968 | Maurer | 73/203 |
| 3,276,258 | 10/1966 | Rowley | 73/194 |
| 2,314,877 | 3/1943 | Hall | 73/204 |
| 3,308,662 | 3/1967 | Mauer | 73/203 |
| 3,613,451 | 10/1971 | Scott | 73/231 |
| 2,293,478 | 8/1942 | Stevenson | 73/203 |
| 2,747,403 | 5/1956 | Stevenson | 73/203 |

*Primary Examiner*—Herbert Goldstein
*Attorney, Agent, or Firm*—Christensen, O'Connor, Garrison & Havelka

[57] ABSTRACT

A mass flow rate transmitter is adapted for insertion in a fuel line for measurement of the mass flow rate of fuel through the line over a wide range of flow rates, e.g., 300–90,000 pounds per hour (PPH). The flowmeter includes a housing and inlet and outlet fittings. The housing has a centrally located, annularly shaped measurement channel and a plurality of bypass channels concentrically positioned in an annular pattern about the measurement channel. A measuring unit, including an impeller coupled by a coiled torsion spring to a constant speed motor, is positioned in the measurement channel. The impeller lags behind the motor shaft by an angle dependent upon the angular momentum imparted to the fluid flowing through the measurement channel. A sensing unit, also in the housing, measures this lag angle to provide a signal proportional to the mass flow rate of fluid through the measurement channel. A valve is provided for each of the bypass channels. At low flow rates the valve is partially closed to minimize fluid by-pass through the channels. At high flow rates the valve is opened to increase the flow rate through the bypass channels. Appropriate circuitry is also provided to condition the signal from the sensing unit and provides visual readout of mass flow rate. The circuitry compensates for the varied bypass flow in the two operational modes of low flow rate and high flow rate.

13 Claims, 5 Drawing Figures

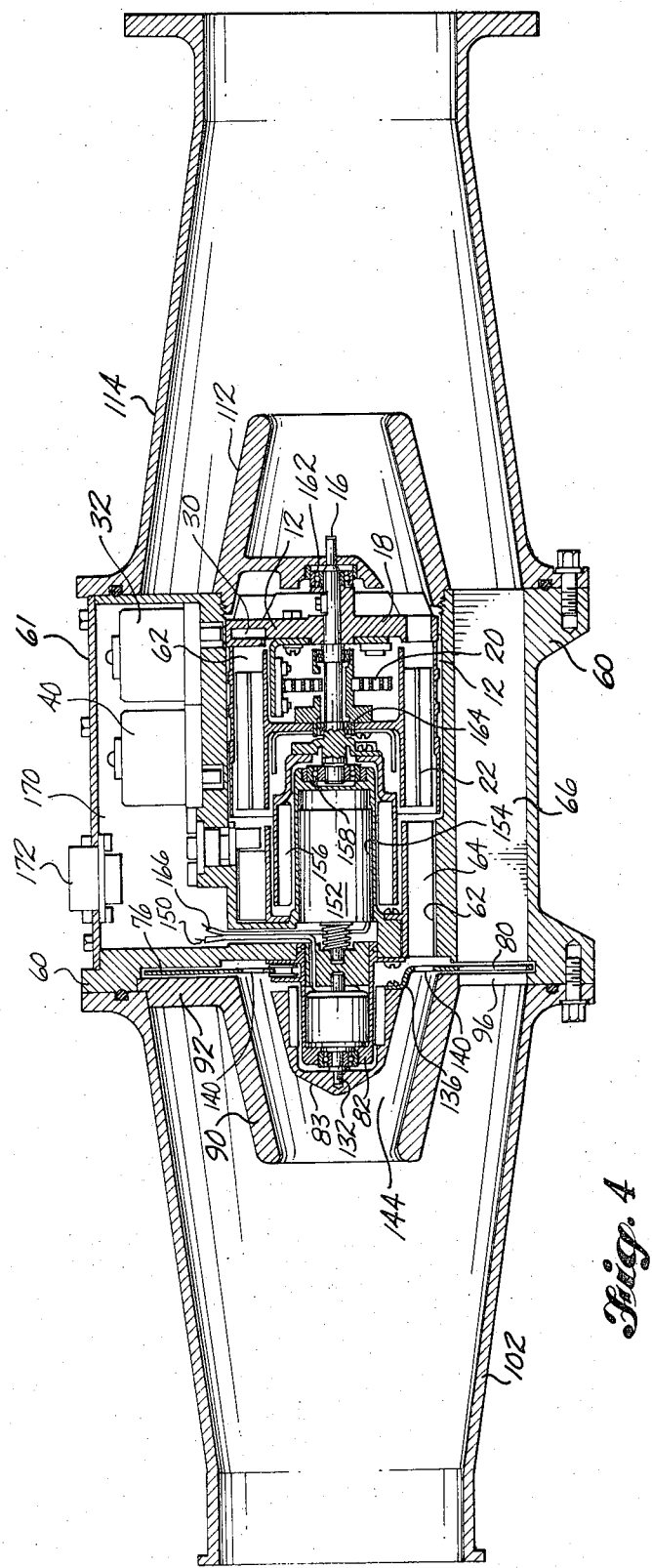

BYPASS FLOWMETER

BACKGROUND OF THE INVENTION

This invention relates to flowmeters and more particularly to mass rate flowmeters in which a portion of the fluid measured bypasses the measuring unit when the flowmeter is operating under high flow conditions.

Mass flowmeters of the type to which the present invention generally relates are known in the prior art. Such mass flowmeters are exemplified by the systems described in U.S. Pat. No. 3,276,258 to Rowley and U.S. Pat. No. 3,071,000 to Cooper. These flowmeters have an impeller mounted in a measurement channel. The impeller is coupled by a torsion spring to a constant speed motor. After fluid flowing through the measurement channel has passed through straightening vanes, the rotating impeller imparts angular momentum to the fluid. The impeller, because of the torsion spring coupling, will lag behind the drive motor by an angle dependent upon the angular momentum imparted to the fluid. The lag angle is proportional to the mass rate of fluid flow through the impeller. Measurement of this angle will provide an output signal which is proportional to mass flow rate. This signal can be properly conditioned for a given fluid to provide a second signal which is fed to a visual readout device.

It has been found that mass flowmeters of the general type described above maintain their accuracy only through a relatively narrow range of flow rates, for example, a typical mass flowmeter of this type will maintain its accuracy over flow ranges of 300 PPH (pounds per hour) to 12,000 PPH (flow range of 40 to 1). For many applications this flow rate range is quite adequate. However, as indicated in the Rowley patent, identified above, certain applications require accurate measurement over wider flow ranges, for example, a flow range of 64 to 1 or greater. Rowley suggests one means for increasing the accuracy over a wider flow rate range.

The Rowley system has been found to be inadequate for very wide flow rate ranges, for example, 300 to 1. Such wide flow rate ranges are encountered in the aircraft engine industry, and especially in military aircraft applications where fuel flow becomes very high when the engine is operating in an afterburner mode. Fuel requirements however can be quite low at normal cruise power. For such engine applications accurate mass flow rate indication over ranges of, for example, from 300 PPH to 90,000 PPH (300 to 1) are required.

It is therefore an object of the present invention to provide a mass flowmeter of the angular momentum type which can provide accurate indications of mass flow rate over very wide flow ranges. It is an object of the present invention to package such a flowmeter in a relatively small volume. It is a further object of the present invention to provide a mass flowmeter which has a very low pressure drop across the flowmeter under all operating conditions. It is a further object of the present invention to maintain accuracy over a wide range of fuel flow even under suction feed conditions. It is a further object of the present invention to incorporate present flowmeter hardware into and adapt such hardware to provide a flowmeter which maintains its accuracy over wide flow ranges.

SUMMARY OF THE INVENTION

A mass flowmeter comprising means for defining a first flow channel and a second flow channel bypassing the first flow channel, impeller means mounted for rotation in the first flow channel for imparting angular momentum to a fluid flowing therein, means for driving the impeller, means for coupling the impeller means and the motor means, the coupling means being resilient to allow the impeller means to lag behind the motor means by an angle dependent upon the angular momentum imparted to the fluid in the first flow channel.

In a preferred embodiment the mass flowmeter comprises a housing defining a first flow channel and a plurality of flow channels spaced from each other and located around the first flow channel, means mounted in the first flow channel for providing a signal proportional to the mass flow rate of fluid flowing therethrough, and a valve member mounted in the housing adjacent the plurality of flow channels and movable between a first and a second position, the valve member containing a plurality of apertures registering with the plurality of flow channels when the valve member is in the first position, the valve member at least partially restricting the flow of fluid in the plurality of flow channels when in the second position.

The present invention also provides a mass flow meter system comprising a housing adapted for interposition in a fluid line, the housing defining a first flow channel and at least one bypass flow channel, means mounted in the first flow channel for providing a signal proportional to the mass flow rate of fluid flowing therethrough, valve means mounted in the bypass flow channel and movable between the first position and at least a second position, the valve being normally in the first position, means for conditioning the signal to indicate mass fluid flow rate through the housing, and means responsive to a predetermined mass flow rate through the housing for actuating the valve means to the second position.

BRIEF DESCRIPTION OF THE DRAWINGS

A better understanding of the present invention can be derived by reading the ensuing specification in conjunction with the accompanying drawings wherein:

FIG. 3 is a broken-away view of the valve arrangement of the present invention;

FIG. 4 is a detailed view in cross section of the preferred embodiment of the flowmeter of the present invention.

DESCRIPTION OF THE PREFERRED EMBODIMENT

Figure 1:
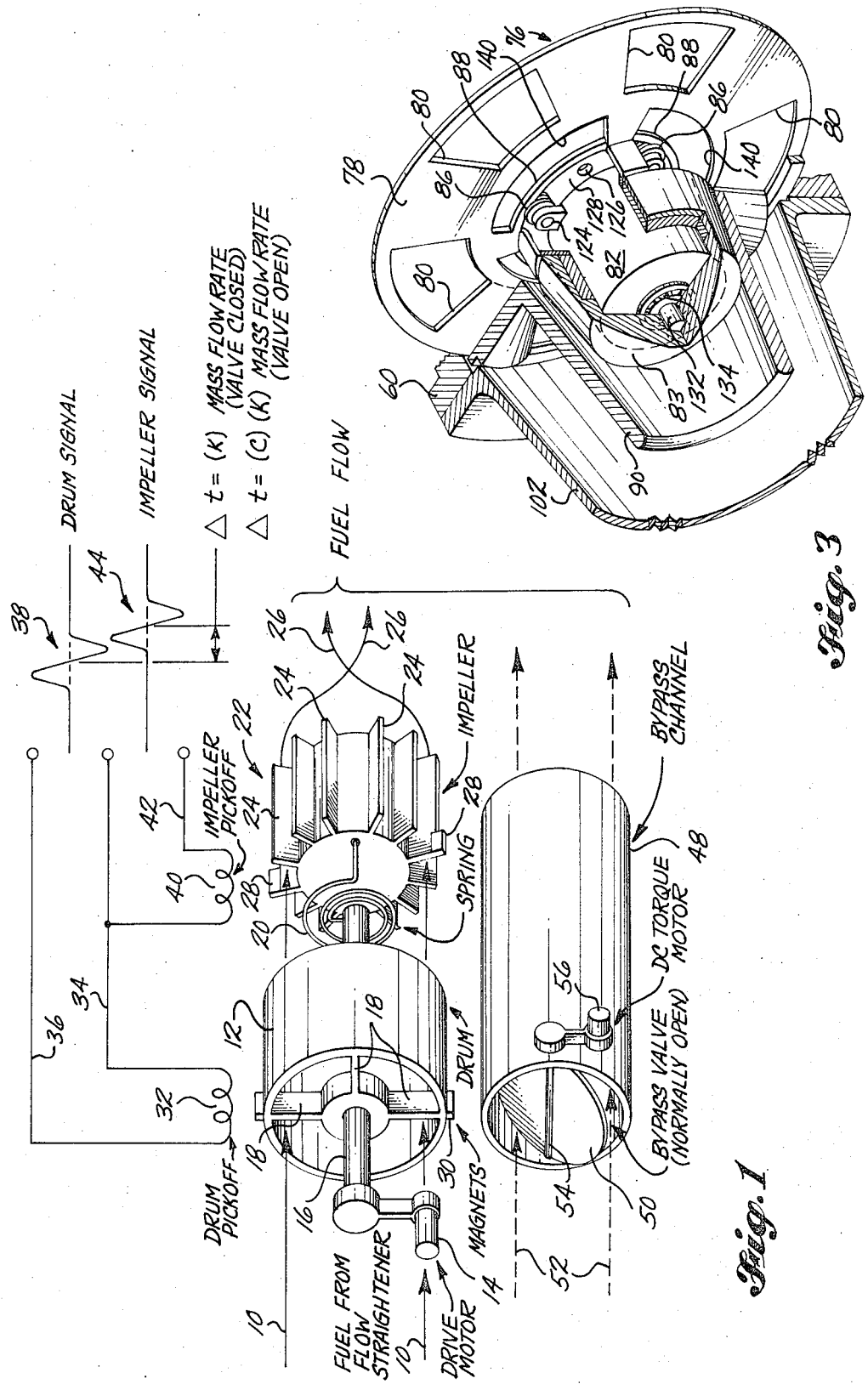
FIG. 1 is a simplified pictorial diagram of the mass flowmeter of the present invention.

The pictorial diagram of FIG. 1 will aid in illustration of the principle under which the flowmeter of the present invention operates. The invention will be described as it is used in one environment, i.e., for the measurement of fuel mass flow rate to a jet engine. It is to be understood that the flowmeter can be utilized for other liquids.

The flowmeter is designed for introduction into the main fuel line from a storage tank to an engine. Fuel is directed in the direction of arrows 10 through a flow straightener to a drum 12. Drum 12 is driven by a motor 14, here represented by a crank coupled to shaft 16. The motor 14 is driven preferably at a constant speed, for example 125 rpm. A number of spokes 18 connect the shaft 16 to the drum 12. Shaft 16 is connected by a resilient coiled, torsion spring 20 to an impeller assembly 22. The impeller assembly 22 includes a plurality of impeller blades 24 between which the fuel flows. The impeller blades 24 accelerate the fuel flowing therebetween in a tangential direction as illustrated by arrows 26. In doing so, of course, angular momentum is imparted to the fuel. As angular momentum is imparted to the fuel by impeller blades 24, the impeller assembly 22 is deflected relative to the drum 12 due to the torque required to impart given angular momentum to the fuel. Since the spiral spring is designed with a linear torque deflection characteristic, the deflection angle of the impeller assembly 22 with respect to the drum 12 is a measurement of this torque. This result assumes a constant angular velocity of the drum 12, which is driven by constant speed motor 14.

As described above, the lag angle of the impeller assembly 22 with respect to the drum is proportional to the mass flow rate of fluid through the impeller assembly 22. The impeller assembly 22 has two permanent magnetic elements 28 connected to impeller blades 24 and located 180° apart. Likewise the drum 12 has two permanent magnets 30 located 180° apart on its peripheral surface. A drum pickoff coil 32 is located at a stationary position adjacent the rotational path of the permanent magnets 30 on the drum. As the magnets 30 pass the pickoff coil 32 a current is induced in the coil 32 which is transmitted along lines 34 and 36. The induced current in lines 34 and 36 is represented by the sinusoid 38 as the drum output signal. Likewise an impeller pickoff coil 40 is located adjacent the rotational path of the permanent magnets 28 on the impeller assembly 22. As the permanent magnets 28 pass the coil 40, a current is induced in the coil 40 which is transmitted along lines 34 and 42. This current is represented by the sinusoid 44 as the impeller output signal.

Because of the angular lag between the impeller assembly 22 and the drum 12 there will be a time lag between the zero points of the drum signal and impeller signal. The differential displacement of the zero points of the drum signal and impeller signal ($\Delta t$) is proportional to the mass flow rate of fuel through the impeller assembly 22.

In one mode of operation the flow meter of the present invention bypasses the impeller assembly 22 through a bypass channel 48. In the preferred embodiment a valve 50 is positioned in the bypass channel 48 to vary the flow therethrough. The flow of fuel through the bypass channel 48 is represented by arrows 52. The bypass valve 50 is normally open, i.e., it is biased to a normally open position by, for example, a spring connected to the valve shaft 54 or by the flow of fuel in the direction of arrows 52. A motor 56, represented by the crank, is connected to the valve shaft 54. At high flow rates the motor 56 is deenergized. Thus the valve 50 remains in its open position allowing a part of the fuel flowing into the flowmeter to bypass the impeller assembly 22. When the fuel flow drops below a predetermined value, motor 56 is activated causing the valve 50 to close the bypass channel 48. Thus all flow through the flowmeter is directed through the impeller assembly 22. In a most preferred embodiment the valve 50 will not be entirely closed, thus always allowing some leakage through the bypass channel 48. This will result in more stable operation, greater reliability because no seals are required, and less power required to activate than if the bypass channel is completely closed.

When the valve is closed the time differential ($\Delta t$) between the drum signal and impeller signal is directly proportional to mass flow rate by some constant (K). It has been found that when the bypass channel 48 is in a flow condition, i.e., when valve 50 is open, that the ratio of fuel flowing through the bypass channel to the fuel flowing through the impeller assembly is essentially constant. When the bypass channel 48 is open at high flow rates, the time differential ($\Delta t$) between the drum signal and impeller signal will be proportional to the mass flow rate by the constant (K) multiplied by another constant (C), which compensates for the fuel bypassing the impeller assembly 22.

Figure 2:
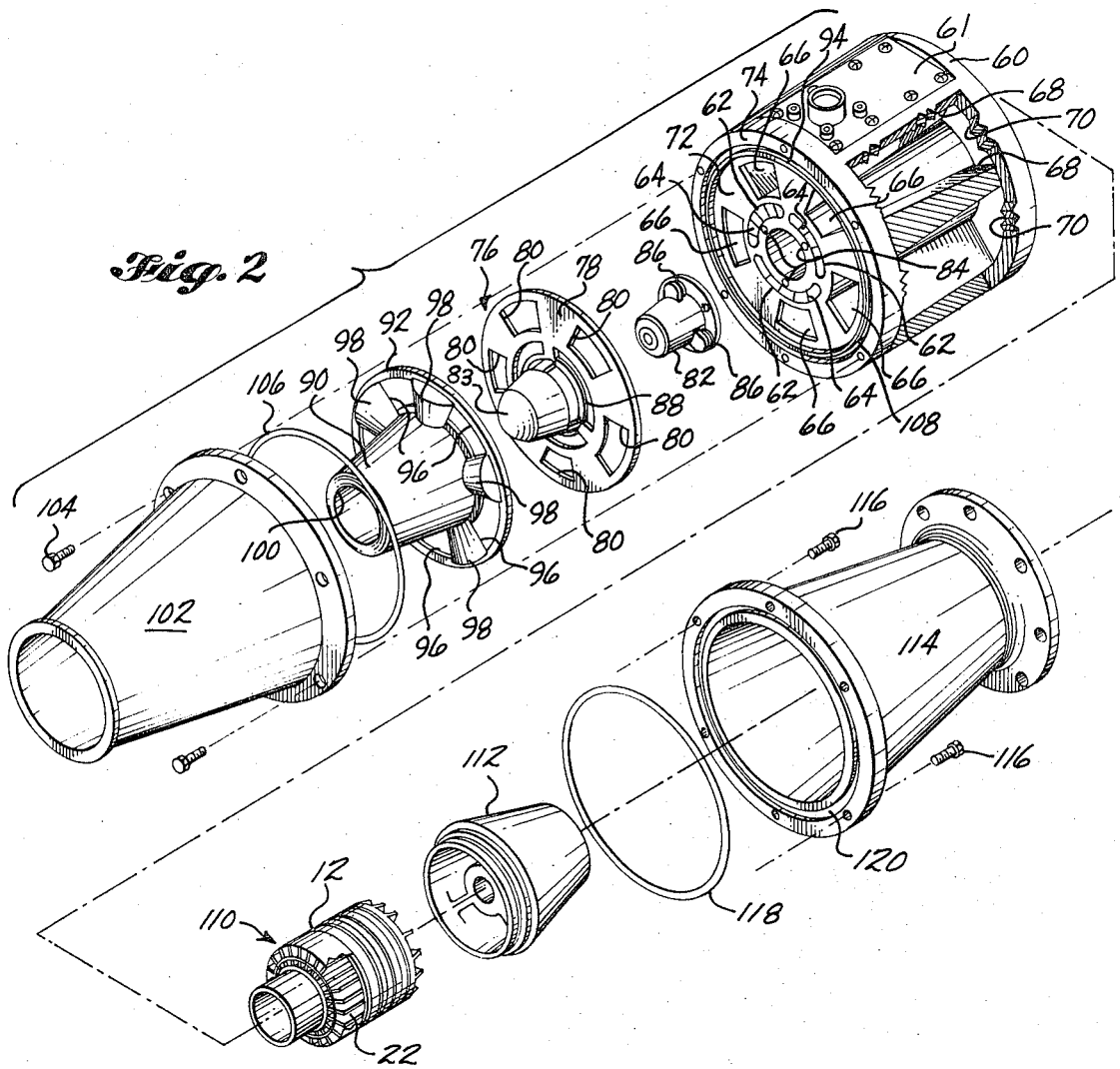
FIG. 2 is an exploded isometric view of a preferred embodiment of the flowmeter of the present invention.

A more detailed view of a preferred embodiment of the present invention is shown in an exploded isometric view in FIG. 2. The main flowmeter housing 60 is of generally cylindrical configuration. An access door 61 is connected with suitable fasteners to the top of housing 60. Door 61 provides a cover for a chamber (not shown) which houses the drum and impeller pickoff coils. A first series of flow channels 62 are formed in an annular pattern in the center of housing 60. These channels 62, hereafter referred to as the measurement channels, contain in their forward portion straightening vanes 64, the forward edges of which can be seen. Five bypass channels 66 are concentrically located in an annular pattern outside the measurement channels 62. The bypass channels are formed in housing 60 so that their side walls 68 taper slightly outwardly in a verturi-like shape. Thus cross-sectional area of the outlets to bypass channels 66 is preferably twice that of the inlets 70 of the bypass channels 66.

The inlets to the bypass channels 66 and the measurement channels 62 are located on face 72 of the housing 60. Face 72 is slightly recessed from the forward edge 74 of the housing 60. By-pass valve 76 mates with face 72 on housing 60. Valve 76 includes an outer annular portion 78 which contains five apertures 80 corresponding in size to the inlets of the bypass channels 66. The apertures 80 in annular portion 78 are so spaced that when the valve 76 is in a first position the apertures 80 align with the inlets to by-pass channels 66 to allow flow through the bypass channels 66. When the valve 76 is rotated through a predetermined angle the apertures 80 deregister from the inlets to bypass channels 66 to stop flow through the bypass channels 66. In a most preferred embodiment of the invention the apertures 80 do not totally deregister with the inlets to bypass channels 66, but allow some leakage through the channels. Valve 76 is driven by a DC torque motor rotor 83 attached to the valve 76. The motor rotor 83 is journalled on stator housing 82 which is attached to face 72 via threaded holes 84 and suitable fasteners. Stator housing 82 carries three wheels 86 mounted for rotation on suitable axles. A ring-shaped track 88 on valve member 76 rides in grooves on wheels 86 to mount the valve member 76 for rotation.

Inlet flow fairing 90 is integrally combined with a bypass entrance plate 92. Bypass entrance plate 92 locates in groove 94 of housing 60. The bypass entrance plate 92 contains five openings 96 which register with the inlets to bypass channels 66 in the housing 60. The portions 98 of the bypass entrance plate have rounded faces to improve fuel flow into the bypass channel 66. Fuel flowing into the opening 100 of inlet flow fairing 90 is directed toward the inlets to measurement channels 62. An inlet end fitting 102 is connected to housing 60 by means of fasteners 104 and appropriate mating holes. An O-ring 106 is positioned in groove 108 in housing 60 and a mating groove in the inlet end fitting 102 to provide a fluid-tight seal.

The measurement assembly 110 is inserted into the measurement channels 64. Measurement assembly 110 includes a constant speed electric motor, the impeller assembly 22, the drum 12 and the torsion spring coupling. An outlet flow fairing 112 is threaded into a mating threaded surface in the outlet side of housing 60. An outlet end fitting 114 is then connected to the outlet side of housing 60 by fasteners 116. An O-ring 118 is positioned between the outlet end fitting 114 and the outlet side of housing 60 in groove 120 of end fitting 114 and in a mating groove of the outlet side of housing 60 to provide a fluid-tight seal.

Referring now to the detail view of the valve assembly shown in FIG. 3, a portion of the housing 60 is illustrated with the end fitting 102 and inlet fairing 90 in place. The outer annular portion 78 of valve 76 is shown with inlet apertures 80. The inner ring-shaped track 88 of valve 76 is carried by the wheels 86. The wheels 86 are mounted for rotation on axles 124 which in turn are mounted on flanges of DC torque motor rotor 83. Torque motor stator housing 82 is mounted on flowmeter housing 60 via suitable fasteners through holes 126 in flange 128 of motor stator housing 82. Motor rotor 83 is connected via arms 136 to the spokes of the outer annular portion 78 of valve 76. Flow apertures 140 are also provided in valve 76 which register with the flow space between motor rotor 83 and inlet fairing 90. Fuel continuously flows through apertures 140 into measurement channels 62 (FIG. 2) regardless of the position of valve 76.

Referring now to the detailed cross-sectional assembly view of FIG. 4 the preferred embodiment of the present invention is shown. An inlet fitting 102 and an outlet fitting 114 are attached to the main housing 60 of the flowmeter assembly. Inlet fairing 90 and bypass entrance plate 92 are seated in housing 60. Outlet fairing 112 engages the outlet side of housing 60.

Byapss channel 66 communicates through aperture 80 in valve member 76 and aperture 96 in bypass entrance plate 92. Valve 76 is shown in its open position. The measurement channels 62 are formed interior of the bypass channels 66. The measurement channels contain straightening vanes 64 to direct fuel flow axially through measurement channel 62. The measurement channels 62 communicate with the annular space 144 between the inlet fairing 90 and motor rotor 83 through the apertures 140 in valve 76.

The valve 76 is connected to the motor rotor 83 via arms 136. For one application it is preferred that the valve be biased to an open position. This can be accomplished by a skewed surface on the edges of the valve flow passage. Also, a coil spring (not shown) can be attached to shaft 132 to torque the shaft 132 in a first direction biasing valve 76 to an open position. The rotor 83 of the DC torque motor is journaled on shaft 132 connected to housing 60. When a DC current is applied through leads 150 to the stator 82 of the DC torque motor the rotor 83 is rotated against the bias of the coil spring attached to shaft 132, causing the valve 76 to rotate.

The measurement assembly drive motor stator 152 is securely mounted on flanges 154 to housing 60. The rotor 156 of the impeller drive motor is journaled in bearings 158 and is attached to shaft 16, journaled at its other end in bearings 162. The drum 12 is connected to shaft 16 via spokes 18. The impeller assembly 22 is journaled on shaft 16 via bearings 164 for rotation about shaft 16 independent of the rotation of shaft 16. The impeller assembly 22 is connected to shaft 16 via flat coil torsion spring 20.

When the motor stator 152 is energized via leads 166, the rotor 156 causes shaft 16 to turn. The impeller assembly 22 lags behind the shaft 16 as explained in conjunction with FIG. 1. A magnet 30 (one of which is shown) is mounted in the spokes 18 of the drum 12. A current is induced in drum pickoff coil 32 each time the magnets 30 pass its location. Likewise the impeller magnets 28 (not shown in this view) excite the impeller pickoff coil 40. Leads from the pickoff coils 32 and 40 as well as leads 150 and 166 are located in a chamber 170 in the housing 60, access to which is provided via plate 61. The leads to and from the various elements of the flowmeter are routed through lead opening 172 to the appropriate circuitry.

Figure 5:
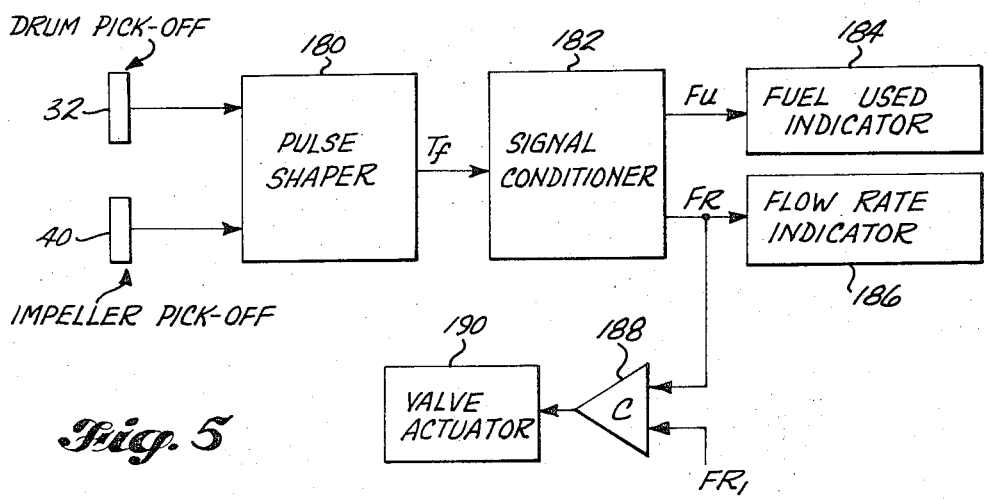
FIG. 5 is a block diagram of the circuitry utilized with the flowmeter of the present invention to provide visual indication of mass flow rate.

FIG. 5 is a block diagram of the circuitry to be used with the flowmeter described above. The drum pickoff coil 32 and the impeller pickoff coil 40 transmit the current pulses derived from the magnets on the drum and impeller assembly along appropriate leads to a pulse shaper 180. The pulse shaper 180 combines the two signals to provide an output signal ($T_f$) related to the impeller lag. This signal ($T_f$) is fed to a signal conditioner 182 which converts it to a fuel used signal (FU) and a flow rate signal (FR). The fuel used signal (FU) is fed to an indicator 184 for visual readout. The flow rate signal (FR) is fed to a flow rate indicator 186 for visual readout of the mass flow rate.

The flow rate signal (FR) from the signal conditioner 182 is also fed to a comparator 188. When the flow rate signal (FR) exceeds a reference signal ($FR_1$), the comparator 188 forwards an output signal to the valve actuator 190. In the preferred embodiment when the flowmeter is operating in a low flow rate mode, the valve actuator 190 (torque motor) is energized to partially close the bypass valve. As the flow rate increases above the reference flow rate ($FR_1$) the output signal from comparator 188 will deenergize the valve actuator. Thus the bypass valve will return to its normally open position to allow full bypass capability.

In an actual embodiment of the present invention the flowmeter designed and constructed in accord with the above-described preferred embodiment operates accurately over a flow rate range of 300 PPH to 90,000 PPH. This embodiment will operate in its lower range, i.e., with the valve member partially closed, to provide accurate mass flow rate data over a range of 300 PPH to 11,000 PPH. In this embodiment the reference signal ($FR_1$) to the comparator 188 is 11,000 PPH. When the flow rate begins to exceed this reference value, the valve is allowed to return to its normally open position.

Thus the same flowmeter is capable of accurate flow rate indications over the remaining range of 11,000 to 90,000 PPH. When operating in a high flow rate mode (above 11,000 PPH), the signal conditioner 182 includes appropriate compensate to com-pensate for the increased bypass flow.

The present invention has been described with respect to a preferred embodiment thereof. It is to be understood that various alterations, substitutions of equivalents and other changes can be made to this embodiment without departing from the original concept of the invention. It is intended that the invention be limited only by the definition contained in the appended claims.

What is claimed is:

1. A mass flowmeter comprising:
   housing means defining a first flow channel having an axis extending in the direction of flow and defining a plurality of flow channels spaced from each other and located around said first flow channel, said plurality of flow channels having inlets lying in a plane, said first flow channel being annularly shaped, said plurality of flow channels being spaced from each other and being substantially equidistantly spaced from the axis of said first flow channel,
   means mounted in said first flow channel for providing a signal proportional to the mass flow rate of fluid flowing therethrough,
   a valve member mounted in said housing adjacent said plurality of flow channels and movable between a first and a second position, said valve member having an annularly shaped face containing a plurality of apertures, said face of said valve member being substantially planar and positioned adjacent to said inlets, said apertures registering with the plurality of flow channels when said valve member is in said first position, said valve member stopping the flow of fluid in said plurality of flow channels when in said second position.

2. The flowmeter of claim 1 further comprising:
   means for biasing said valve member toward said first position,
   means for actuating said valve member to said second position.

3. The flowmeter of claim 2 wherein said means actuating said valve member comprises a torque motor mounted on said housing.

4. The flowmeter of claim 3 wherein said plurality of flow channels are venturi shaped.

5. A mass flowmeter comprising:
   housing means defining a first flow channel having an axis and defining a plurality of flow channels spaced from each other and located around said first flow channel, said plurality of flow channels having inlets lying in a plane, said first flow channel being annularly shaped, said plurality of flow channels being spaced from each other and being substantially equidistantly spaced from the axis of said first flow channel,
   a valve member mounted in said housing and associated with said plurality of flow channels and movable between a first and a second position, said valve member having an annularly shaped face containing a plurality of apertures registering with the plurality of flow channels when said valve member is in said first position, said valve member at least partially restricting the flow of fluid in said plurality of flow channels when in said second position, said face of said valve member being substantially planar and positioned adjacent to said inlets,
   means for actuating said valve member to said second position comprising a torque motor including a motor enclosure mounted on said housing concentrically with said first flow channel, means mounted on said enclosure for mating with the inner periphery of said annularly shaped valve member and supporting said valve member for rotation, and a rotor mounted for rotation on said motor enclosure and attached to said valve member to drive said valve member to said second position, said rotor being spring-biased to urge said valve member toward said first position,
   an inlet fairing mounted on said housing for dividing the flow between said first flow channel and said plurality of flow channels, and
   means mounted in said first flow channel for providing a signal proportional to the mass flow rate of fluid flowing therethrough.

6. A mass flowmeter comprising:
   means for defining a first flow channel having an axis extending in the direction of flow and defining a second flow channel bypassing said first flow channel, said first flow channel being annularly shaped about said axis, said second flow channel being annularly shaped and located substantially concentrically of the axis of said first flow channel, said second flow channel being divided into a plurality of channel sections each having an entrance port and an exit port, said channel sections having an increasing cross-sectional area from inlet port to outlet port,
   impeller means mounted for rotation in said first flow channel for imparting angular momentum to a fluid flowing therein,
   motor means for driving said impeller,
   means for coupling the impeller means and the motor means, the coupling means being resilient to allow the impeller means to lag behind the motor means by an angle dependent upon the angular momentum imparted to the fluid in the first flow channel,
   means for measuring the amount of lag to provide an indication of mass flow.

7. The mass flowmeter of claim 6 further comprising:
   valve means mounted in said second flow channel to vary the flow of fluid therethrough.

8. The mass flowmeter of claim 7 wherein said valve means is movable between an open position and a closed position, said valve means being biased toward said open position, said flowmeter further comprising means for actuating said valve means to said second position responsive to a predetermined mass flow rate through said first channel means.

9. A mass flowmeter system comprising:
   a housing adapted for interposition in a fluid line, said housing defining a first flow channel and a plurality of flow channels bypassing said first flow channel, said plurality of flow channels having an increasing cross-sectional area in the direction of flow,
   means mounted in said first flow channel for providing a signal directly proportional to the mass flow rate of fluid flowing therethrough, valve means mounted in relation to said plurality of channels to vary fluid flow therethrough, said valve means movable between a first open position and at least a second closed position, said valve means being normally in said first position, means for conditioning said signal to indicate mass flow rate of fluid through said housing, and means responsive to a predetermined mass flow rate through said housing for actuating said valve means to said second position.

10. The flowmeter system of claim 8 wherein said means for conditioning provides an indication of mass flow rate over a predetermined low range and an adjoining predetermined high range, said predetermined flow rate being between said low range and said high range.

11. The flowmeter system of claim 8 wherein said valve means is spring-biased toward said normally open position.

12. The flowmeter system of claim 8 wherein said first flow channel is substantially annularly shaped and wherein said plurality of flow channels are arranged in an annular pattern substantially concentrically around said first flow channel.

13. A mass flowmeter system comprising:

a housing adapted for interposition in a fluid line, said housing defining a first flow channel and at least a second flow channel bypassing said first flow channel, means mounted in said first flow channel for providing a first signal directly proportional to the mass flow rate of fluid flowing therethrough, valve means mounted in relation to said second flow channel to vary the flow of fluid therethrough, said valve means movable only between a first open position and a second closed position, said valve means being spring-biased toward said first position, means for conditioning said first signal to indicate mass flow rate through said housing, means for actuating said valve means to said second position, said means for actuating being responsive to a predetermined mass flow rate indicated by said means for conditioning.

\* \* \* \* \*

UNITED STATES PATENT OFFICE
CERTIFICATE OF CORRECTION

Patent No. 3,807,229       Dated April 30, 1974

Inventor(s)      William Edward Chiles

It is certified that error appears in the above-identified patent and that said Letters Patent are hereby corrected as shown below:

Claim 10, line 1, delete "8" and insert therefor --9--.

Claim 11, line 1, delete "8" and insert therefor --9--.

Claim 12, line 1, delete "8" and insert therefor --9--.

Signed and sealed this 1st day of October 1974.

(SEAL)
Attest:

McCOY M. GIBSON JR.
Attesting Officer

C. MARSHALL DANN
Commissioner of Patents